UNITED STATES PATENT OFFICE 2,281,096

PRODUCTION OF UNSATURATED HALOGEN-CONTAINING COMPOUNDS

William Engs, Piedmont, Calif., Herbert P. A. Groll, Hamburg-Wellingsbuttel, Germany, and Alasdair W. Fairbairn, Oakland, Calif., assignors to Shell Development Company, San Francisco, Calif., a corporation of Delaware No Drawing. Application November 20, 1939, Serial No. 305,334

11 Claims. (Cl. 260—655)

The present invention relates to the production of desirable unsaturated halogen-containing aliphatic organic compounds possessing at least three carbon atoms in the molecule and containing a greater number of unsaturated bonds or ethylene linkages than the unsaturated halide subjected to treatment according to the present process.

The invention also covers the production of halogen-containing poly-olefinic compounds from unsaturated halides which are capable of further unsaturation. In one of its specific embodiments, the invention includes the formation of halogen-containing diolefinic aliphatic organic compounds from corresponding halogen-containing mono-olefins, these latter unsaturated halides being structurally capable of further unsaturation.

In order that an aliphatic unsaturated organic compound be capable of further unsaturation, i. e., have a plurality of ethylene linkages, it must contain at least three carbon atoms and must have at least two replaceable hydrogen atoms distributed on two contiguous carbon atoms, only one of which may be attached to still another carbon atom by a double bond. Therefore, the invention covers the treatment of aliphatic unsaturated halides or halogen-containing compounds having at least three carbon atoms and at least two replaceable hydrogen atoms on two contiguous carbon atoms only one of which may be unsaturated, to produce halogen-containing unsaturated organic compounds having a greater number of ethylenic linkages than the material treated. By an unsaturated aliphatic halide is meant a halogen-containing compound of non-aromatic structure which contains at least one ethylene linkage, and may contain one or more radicals of the group consisting of hydroxy, alkoxy, carbalkoxy, carbonyl, amino and the like radicals.

Representative examples of unsaturated aliphatic halides which may be treated in accordance with the process of the present invention are:

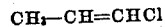
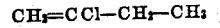
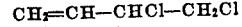

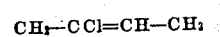

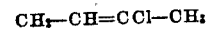

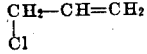
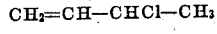
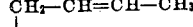
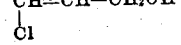

It is to be noted that all of the above halogen-containing compounds have at least three carbon atoms and at least two replaceable hydrogen atoms distributed on two contiguous carbon atoms, not more than one of which is unsaturated. Therefore, these unsaturated aliphatic halides may be subjected to further unsaturation according to the invention to produce valuable halogen-containing poly-olefinic compounds.

It has been found that such unsaturated aliphatic halogen-containing organic compounds produce halogen-containing compounds having a greater number of ethylene linkages when they are submitted to the action of a halogen at relatively high temperatures. It has also been found that when a mono-olefinic aliphatic halide of the class described is subjected to the action of a halogen at quite elevated temperatures, the main reaction product is a halogenated diolefin.

The minimum temperature at which diolefin formation takes place, being governed by the structure of the carbon skeleton, the position of the ethylene linkage and the position and number of halogen atoms present, is dependent upon the material being subjected to treatment. For example, in the case of the formation of 2-chlorbutadiene-2 from 2-chlorbutene-2 according to the present invention, such minimum temperature is in the neighborhood of about 360° C.

As to the maximum temperature, it will depend on the operating conditions and the nature, character and quantity of reactants. At any rate, the operating temperature should be below that at which substantial rupture of the carbon chains occurs.

In the parent copending application, Serial No. 142,664, which issued as U. S. Patent No. 2,189,890 it has been shown that, depending on the prevailing operating conditions, the members of the above-mentioned class or group of unsaturated aliphatic organic compounds may be converted either into products predominating in polyhalides having a greater number of halogen atoms and the same number of olefinic linkages than the starting material, or products which predominate in compounds having the same number of halogen atoms as the starting material, but containing a greater number of ethylenic linkages. Thus, as an example, when 2-chlorbutene-2 is subjected to the action of chlorine at about 350° C., or slightly lower temperatures, the main reaction product is 1,2-dichlorbutene-2. On the other hand, under substantially the same operating conditions, but at a temperature of 515° C., the products resulting from the treatment of the 2-chlorbutene-2 with chlorine predominate in chlordiolefins.

Since the reaction time and temperature employed are interrelated, it is obvious that, at certain temperatures, particularly at those approaching the above-mentioned lower limit, it is generally possible to obtain as a predominant product either a compound containing the same number of ethylenic linkages and a greater number of halogen atoms than the starting material, or a compound with the same number of halogen atoms but containing more ethylene linkages than the unsaturated halide undergoing treatment. In other words, depending on the temperature and reaction time, an aliphatic unsaturated organic halide compound of the class described may either be further halogenated or further unsaturated. Thus, if, for example, when operating under conditions such that a mono-olefinic mono-halide is converted to a reaction product predominating in a mono-olefinic polyhalide, and if the temperature be raised appreciably, the product will be found to be richer in diolefinic products depending on the magnitude of the temperature increase. Now, by maintaining this new increased temperature it is generally possible to counteract the increase by lowering the reaction time, in which case a product comparable to that obtained under the first conditions will again be obtained. Therefore, in order to produce compounds having a greater unsaturation, i. e., a greater number of ethylenic linkages than the starting material, it is necessary to employ the relatively high temperatures of above about 360° C. for a sufficient period of time to effect the unsaturation of the starting material. Also, as stated, the optimum temperature for effecting the unsaturation according to the present invention is somewhat dependent upon the time of reaction. With very short times of reaction, relatively high temperatures may in many cases be successfully employed. In general, reaction times of less than 60 seconds are preferable. However, longer reaction times may be employed in some cases, particularly when operating near the lower limit of the temperature range.

Since the requisite time of reaction is usually comparatively short, particularly at temperatures considerably above the lower temperature limit for effecting the reaction, it is preferable to preheat the reactants separately before mixing. This is due to the fact that, at the relatively lower temperatures, the interaction between unsaturated aliphatic halides and the halogen results in the formation of undesirable products such as products of halogen addition and/or halogen substitution. Therefore, if it is attempted to heat the reactants to the desired temperature after the reactants have been commingled, it is found that these undesirable halogen addition and substitution reactions take place to a substantial extent before the desired or optimum temperature is attained. In some cases, particularly when metal preheaters are employed, it is possible or even advantageous to preheat only the unsaturated aliphatic organic compound, then commingle this preheated reactant with unheated halogen gas, and inject the mixture thus obtained into the reaction zone maintained at the desired or optimum reaction temperature of the described magnitude. This avoidance of separate preheating of the halogen is desirable because the hot halogen, when in a concentrated state, reacts with metals to form volatile metallic halides which, by catalyzing the reaction, causes considerable carbonization of the organic reactant and/or products. On the other hand, when the halogen concentration is low because of its dilution by the other reactant, the formation of the volatile metallic halides is sufficiently decreased to eliminate or at least greatly decrease the undesirable carbonization. However, it is frequently advantageous to effect the reaction in metal-free reaction chambers, such as those made of or lined with carbon.

The reactions involved are exothermic in nature so that the preheating of the reactants need not be carried to the desired or optimum reaction temperature. Thus, the preheating of the halogen gas and/or of the unsaturated aliphatic halide to be further unsaturated to temperatures between about 100° C. and 300° C. is sufficient to cause the reaction temperature to rise to the desired degree. In fact, inert diluents, such as nitrogen, helium, carbon dioxide, etc., may be present in the reaction system, such diluents facilitating temperature control. Although the exothermic nature of the reaction between the unsaturated halides and the halogen is not nearly as liable to cause explosions and flaming as the halo-substitution reaction of olefins, there often exists a tendency to flame. This tendency may be overcome by the use of the aforementioned diluents. Also, the flaming tendency may be avoided by maintaining a lineal velocity of the reactants through the reaction zone above that of the speed of flame propagation.

The reaction may be effected with various mol ratios of halogen to unsaturated halogen-containing compound, this ratio varying principally with the material to be treated. Excellent results have been obtained by maintaining the mol ratio of halogen to the halide treated at about 1:1.5 to 1:2.5, although higher or lower ratios may be employed. In general, higher ratios will lower the yield of the desired product, while lower ratios will lower the production capacity.

Although the unsaturation reaction according to the present invention may be effected without the use of reaction promoters, catalysts of the type of the halides of iron, antimony, tin, phosphorus, aluminum, barium, etc., or metallic iron, sulfur or active carbon, and the like, may be used.

The following examples are presented solely to illustrate suitable applications of the invention and modes of executing the same. These examples, however, are not to be considered as limiting the scope of the invention as to the reactants, mode of execution, reaction conditions, and the like.

*Example I*

2-chlorbutene-2 ($CH_3-CCl=CH-CH_3$) was reacted with chlorine in a mol ratio of about 2 to 1. The preheated reactants were mixed at about 100° C. and the mixture passed into a carbon reaction tube maintained at a temperature of about 500° C. The condensed reaction product was washed with water, dried and fractionated. The main reaction products were chloroprene (2-chlorbutadiene-1,3) which boils at 60° C. and a mixture of 1,2-dichlorbutene-2 (boiling point 130 to 131° C.) with 2,3-dichlorbutene-1 (boiling point 112° C.). These unsaturated dichlorides are interconvertible via allylic rearrangement.

*Example II*

A stream of 2-chlorbutene-2 at about 266° C. and a stream of chlorine at about 276° C. were mixed in a glass jet in a mol ratio of about 1.75 to 1. The mixture was immediately passed through a carbon tube heated to about 515° C.

The condensed reaction products were washed with water, dried and fractionated. The main reaction product was 2-chlorbutadiene-1,3, with some 2,3-dichlorbutene-1 and 1,2-dichlorbutene-2.

Although the invention has been described in the above examples with particular reference to the treatment of a mono-chlorinated butylene with chlorine to produce chloroprene, it is to be understood that other unsaturated aliphatic halogen-containing organic compounds, and particularly the mono-olefinic unsaturated halides, may be reacted with a halogen, such as chlorine or bromine, to produce halogenated organic compounds having a greater number of ethylene linkages than the primary material treated.

Also, it will be evident to those skilled in the art that the invention may be executed in a batch, intermittent or continuous manner, the latter mode of operation being preferred.

The products formed through the use of the present process are valuable both as intermediates and as final products. Thus, the products obtained from treatment of 2-chlorbutene-2, are useful in the manufacture of synthetic rubber, synthetic resins, etc.

This application is a continuation-in-part of a copending application, Serial No. 142,664, filed May 14, 1937 which issued as U. S. Patent No. 2,189,890.

While the present invention has been described in a detailed and comprehensive manner and provided with specific examples of executing the same, it is to be understood that modifications may be made within the scope of the appended claims.

We claim as our invention:

1. A process for the production of a monochlorbutadiene which comprises separately preheating 2-chlorbutene-2 and free chlorine, commingling said preheated substances, and subjecting the mixture in the vapor phase to a temperature of about 500° C., for a reaction time less than one minute but greater than that favoring the predominant formation of dichlorbutenes, thereby effecting a reaction whereby monochlorbutadiene is predominantly produced, and removing the monochlorbutadiene from the reaction mixture.

2. A process for the production of a monochlorbutadiene which comprises separately preheating 2-chlorbutene-2 and free halogen selected from the group consisting of chlorine and bromine, and reacting said substances in the vapor phase at a temperature of about 500° C. for a reaction period of less than one minute but greater than that favoring the predominant formation of dihalobutenes, thereby obtaining a product predominating in monochlorbutadiene, and removing said monochlorbutadiene from the reaction mixture.

3. A process for the production of a monochlorbutadiene which comprises reacting 2-chlorbutene-2 with free halogen selected from the group consisting of chlorine and bromine in the vapor phase at a temperature above 360° C. but below that at which substantial rupture of the carbon skeleton occurs, for a period of time above that at which optimum yields of polyhalobutenes would normally be obtained at said temperature, for a reaction time less than one minute, and removing the monochlorbutadiene from the reaction system.

4. A process for the production of monochlorbutadiene which comprises reacting preheated 2-chlorbutene-2 with free halogen selected from the group consisting of chlorine and bromine in the vapor phase at a temperature above 360° C. but below that at which substantial rupture of the carbon skeleton occurs, for a period of time sufficient to effect conversion of the chlorbutene to a product predominating in monochlorbutadiene, and removing the monochlorbutadiene from the reaction system.

5. A process for the production of monohalobutadiene which comprises reacting 2-halobutene-2 with free halogen selected from the group consisting of chlorine and bromine in the vapor phase at a temperature above 360° C. but below that at which substantial rupture of the carbon skeleton occurs, for a period of time above that at which optimum yield of polyhalobutenes would normally be obtained at said temperature, thereby obtaining a product containing the monohalobutadiene.

6. The process according to claim 5, wherein the reaction between the monohalobutene and the halogen is effected for a period of time less than about one minute, and wherein the monohalobutadiene is removed from the reaction mixture.

7. A process for the production of a monohalodiolefin which comprises reacting a mono-olefinic aliphatic hydrocarbon monohalide possessing at least three carbon atoms and having at least two replaceable hydrogen atoms distributed on two contiguous carbon atoms with a free halogen selected from the group consisting of chlorine and bromine in the vapor phase at a temperature above 360° C. but below that at which substantial rupture of the carbon chain occurs, for a period of time above that at which optimum yields of mono-olefinic polyhalides would normally be obtained at said temperature, and removing the monohalodiolefin from the reaction system.

8. A process for the production of an unsaturated aliphatic halide which comprises reacting a mono-olefinic aliphatic halide possessing at least three carbon atoms and having at least two replaceable hydrogen atoms distributed on two contiguous carbon atoms, with a free halogen selected from the group consisting of chlorine and bromine in the vapor phase at a temperature above 360° C. but below that at which substantial rupture of the carbon skeleton occurs, for a period of time above that at which optimum yields of mono-olefinic polyhalides would normally be obtained at said temperature, and removing an unsaturated aliphatic halide which contains more ethylene linkages than the unsaturated halide undergoing treatment.

9. The process according to claim 8, wherein the reaction time is less than about one minute.

10. A process for the production of an unsaturated aliphatic halide which comprises reacting an unsaturated ethylene linkage containing aliphatic halide possessing at least three carbon atoms and having at least two replaceable hydrogen atoms distributed on two contiguous carbon atoms only one of which is attached by an ethylene linkage to a still another carbon atom, with a free halogen selected from the group consisting of chlorine and bromine in the vapor phase at a temperature above 360° C. but below that at which substantial rupture of the carbon skeleton occurs, and for a period of time sufficient to effect conversion of the primary material to a product predominating in an unsaturated aliphatic halide which has the same number of halogen atoms but more ethylene linkages than the unsaturated halide undergoing treatment.

11. The process according to claim 10, wherein the reacting between the unsaturated halide and the halogen is carried out for a period of time less than about one minute.

WILLIAM ENGS.
HERBERT P. A. GROLL.
ALASDAIR W. FAIRBAIRN.